UNITED STATES PATENT OFFICE.

ROBERT ERNST ALWIN GANS, OF PANKOW, GERMANY.

IGNITION MATERIAL FOR MATCHES.

SPECIFICATION forming part of Letters Patent No. 698,698, dated April 29, 1902.

Application filed December 21, 1898. Serial No. 699,932. (No specimens.)

*To all whom it may concern:*

Be it known that I, ROBERT ERNST ALWIN GANS, chemist, a subject of the King of Prussia, German Emperor, residing at Pankow, near Berlin, in the Empire of Germany, have invented certain new and useful Improvements in Ignition Materials for Matches and other Purposes, (for which I have applied for a patent in Germany, filed August 8, 1898; in England, filed November 28, 1898, No. 25,102; in France, filed December 1, 1898; in Sweden, filed November 30, 1898, and in Belgium, filed December 3, 1898,) of which the following is a specification.

In order to prepare a comparatively harmless ignition material, more particularly destined for matches, a substance or a chemical reagent which easily gives off its oxygen—such, for instance, as saltpeter, barium peroxid, barium chromate, potassium chlorate, or the like—is mixed with one or more salts of dithionic acid, ($H_2S_2O_6$,) trithionic acid, ($H_2S_3O_6$,) tetrathionic acid, ($H_2S_4O_6$,) pentathionic acid, ($H_2S_5O_6$,) or of acids produced by the oxidation of said acids or of thiosulfuric acid, ($H_2S_2O_3$,) and then worked with a suitable binding substance into a mass of a desired consistence. The material thus obtained may be used as an ignition material either for friction-surfaces or for matches without any addition of white or amorphous phosphorus.

Salts of thiosulfuric acid have long been used in the manufacture of ignition materials, but Muspratt says in his *Chemistry* that no practical result has ever been obtained with these salts. The best results have not given an ignition-point below 142° to 161° Celsius, according to Muspratt. The thiosulfates require an addition of a small quantity of amorphous phosphorus, which sooner or later decomposes and is poisonous. An ignition material prepared from thiosulfates, and especially from thiosulfate of lead, produces, according to Muspratt, an unpleasant smell when burning. The most marked advantages of my ignition material are its low ignition-point, which is between 90° and 100° centigrade, a special friction-surface being, therefore, not required. No addition of phosphorus is necessary, and the material does not, therefore, become poisonous. The heat developed is amply sufficient to ignite paraffin, which is not the case with the thiosulfate material. There is no unpleasant smell in the burning of my material. It is durable and damp-proof, and its cost is no greater than that of the substances hitherto known. The proportion of the substance giving off oxygen to said salts may vary within wide limits. Thus, for instance, one part, by weight, of potassium chlorate and two parts of baryta salt of polythionic acid gives quite as good an ignition material as three parts of potassium chlorate and one part of baryta salt. The ignition-point of the material is very low, so that it may be easily ignited on any friction-surface. By suitable additions the ignition power of the new material may be reduced to any desired extent.

What I claim is—

1. An ignition material composed of a salt of a polythionic acid and a substance which readily yields oxygen, substantially as described.

2. An ignition material composed of a salt of tetrathionic acid and a substance which readily yields oxygen, substantially as described.

In witness whereof I have hereunto signed my name in the presence of two subscribing witnesses.

ROBERT ERNST ALWIN GANS.

Witnesses:
WILLY ZIMMERMANN,
GUSTAV HÜLSMANN.